Oct. 10, 1933.     G. H. EKSTEDT     1,929,919
DOUGH PROCESSING MECHANISM
Filed July 10, 1930     2 Sheets-Sheet 1

INVENTOR
George H. Ekstedt
BY
ATTORNEY

Oct. 10, 1933.  G. H. EKSTEDT  1,929,919
DOUGH PROCESSING MECHANISM
Filed July 10, 1930  2 Sheets-Sheet 2

INVENTOR
George H. Ekstedt
BY
ATTORNEY

Patented Oct. 10, 1933

1,929,919

UNITED STATES PATENT OFFICE 1,929,919

DOUGH PROCESSING MECHANISM

George H. Ekstedt, Minneapolis, Minn.

Application July 10, 1930. Serial No. 466,904

8 Claims. (Cl. 107—8)

The present invention relates to a dough processing mechanism.

In the making of bread it is customary to roll the dough so as to form it into masses of suitable size and shape to be readily placed in the ordinary baking pans in which bread is baked in commercial bakeries. Frequently, dough formed by rolling in this manner when baked into a loaf has large holes in the interior of the loaf and the bread is of an uneven texture.

Another difficulty experienced in baking bread is what is known as shell crusting of the loaves wherein the entire upper crust of the loaf or a large portion thereof is raised upwardly and separated from the body of the loaf.

It has been found that if, instead of using a single mass of dough, two masses of dough are rolled into elongated, substantially cylindrical shapes, and are then twisted together and baked, that the loaf baked from dough treated in this manner is of a more uniform texture than one baked from dough processed in the ordinary manner, and also that shell crusting is entirely eliminated by this processing.

It is present practice where it is desired to twist dough in this manner to roll the dough into smaller cylindrical masses than are ordinarily used and to manually twist two of such masses together to form a twisted mass of dough for the baking of bread.

An object of the present invention is to make an improved and simplified mechanism for the twisting of dough preparatory to baking.

In order to attain this object, there is provided, in accordance with one feature of the invention, a pair of movable elements, movable at different speeds with respect to each other, and a pressure board spaced upwardly from said movable elements a distance substantially equal to the diameter of the mass of dough which it is desired to process therein.

These and other features of the invention will be more fully brought forth in the following description and the accompanying drawings, wherein:

Figure 5 is a vertical, transverse sectional view through the actuating mechanism of the drive rolls of the machine shown in Figure 1.

Figure 4:
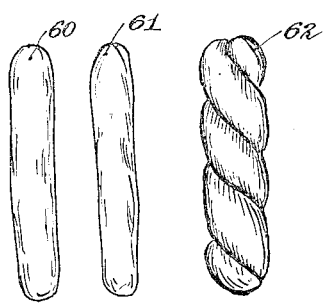
Figure 4 is a view in side elevation of a pair of two masses of dough prior to processing in a mechanism of the present type and also shows the two masses as they would appear twisted together after processing.
Figure 3:
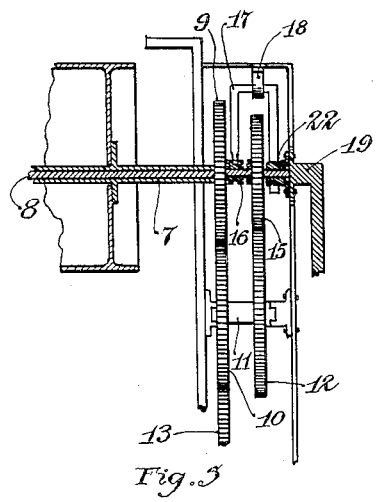
Figure 9:
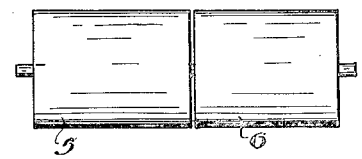
Figure 9 is a view in side elevation of the drive rolls of the mechanism shown in Figures 1 to 6, inclusive.

Referring to the drawings in detail, a frame A comprises upright legs 1, longitudinal side bracing members 2, an upper longitudinal frame member 3 on each side thereof to support the conveying mechanism and associated parts, and transverse end frame bracing members 4. A pair of driving rolls 5 and 6 (see Figure 9) are mounted in one end of the frame on transverse shafts 7 and 8 (see Figure 5), these shafts being telescopically inserted, one within the other, as illustrated in Figure 5, and relatively rotatable one within the other. The outer tubular shaft 7 has a gear 9 securely connected thereto to rotate therewith, which gear is in mesh with a second gear 10 mounted on a counter shaft 11 upon which a gear 12 is mounted to rotate therewith. The gear 10 is in driving engagement with a gear 13 which is driven by means of a suitable gear train, not shown, by means of a motor 14, or other suitable source of power. The gear 12 on the counter shaft 11 is in mesh with a smaller gear 15 which rotates freely on the inner drive roll shaft 8, which is securely connected to the driving roll 6. A clutch gear 16 is slidably mounted upon the inner shaft 8 and is splined thereto so as to rotate with said inner shaft. This clutch gear is provided with teeth on both sides thereof and the center of the periphery is grooved to receive a forked shifting lever 17. This shifting lever is formed in a U shape and the upper portion thereof is slidably mounted in a bearing 18. The other end of the lever has a cam engagement 22 with a pivoted hand lever 19 mounted to rotate freely on the end of the inner shaft 7. On swinging this lever in one direction, the clutch gear will be forced into engagement with the teeth on the face of the gear 9 so as to cause the inner shaft 8 to rotate with the gear 9 and thereby with the outer tubular shaft 7. This would cause the drive rolls 5 and 6 to rotate at the same speed and thereby drive the belts 20 and 21 at the same speed. By swinging the hand lever 19 in the opposite direction, the cam 22 will draw the shifting fork 17 in the opposite direction, moving the clutch gear 16 into engagement with the smaller gear 15 and causing it to rotate therewith. This smaller gear rotates more rapidly than the gear 9, but in the same direction, and thereby causes the inner shaft 8 to rotate more rapidly than the outer tubular shaft 7, and thus causes the roll 6 to rotate more rapidly than the roll 5, causing the belt mounted on the roll 6 to travel more rapidly than that mounted on the roll 5. By providing this selective differential speed between the two belts the mechanism can be used either to simply roll masses of dough into elongated cylindrical shape by driving both belts at the same speed, or by using the differential speed may be used to twist two cylindrical masses of dough together in the manner illustrated in Figure 4.

Figure 1:
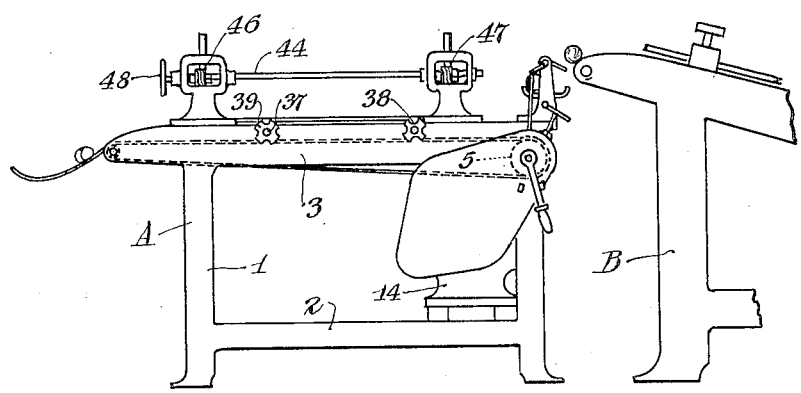
Figure 1 is a view in side elevation of a mechanism embodying the present invention with an ordinary dough processing machine arranged to discharge cylindrical masses of dough into the present mechanism, showing a mass of dough in the act of being tranferred from the first processing machine to a receiving hopper of the present mechanism.
Figure 2:
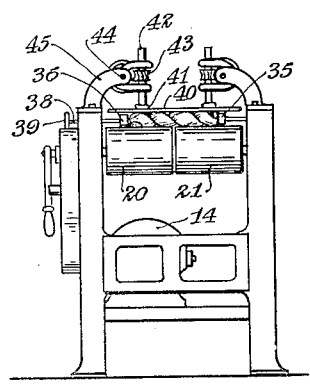
Figure 2 is a view in end elevation of a mechanism embodying the present invention, showing the receiving end of the device with a dough receiving hopper and associated parts removed therefrom to more clearly disclose the mechanism.

When the machine is intended to be used in conjunction with an ordinary type of dough rolling mechanism, it may be mounted as illustrated in Figure 1 so that the elongated rolls of dough are discharged directly into a hopper or pan 24 mounted on the receiving end of the machine. This pan is designed to hold two cylindrical masses of dough, and, upon the receipt of each second cylindrical mass, to discharge the pair of cylindrical dough masses onto the differentially traveling belts of the present mechanism. In the type of discharging mechanism illustrated herewith, the pan 24 is pivotally mounted between a pair of vertical support members 25. An arm 26 is connected to the shaft upon which this pan 24 is mounted and a spring 27 is connected to normally hold the arm 26 downwardly in engagement with a push rod 28. This push rod is provided with a roller 29 on the lower end thereof which rides upon a cam 30. This cam is circular in shape except for a projection 31 which is adapted to raise the push rod and discharge a pair of cylindrical dough masses onto the traveling belts. A plate 32 is pivotally mounted between the upper ends of the uprights 25 to be moved by the masses of dough as they are discharged from the preliminary forming machine B. An arm 33 is secured to the shaft upon which this plate 32 is mounted and is connected by means of a link 34 to a trip pawl, not shown, of a well known type such as that used in punch presses and similar mechanisms. This type of pawl mechanism is well known to the art and it is deemed unnecessary to describe it in detail here. This pawl is arranged so that upon each release thereof the cam 30 will be rotated one-half of a revolution.

Figure 3:
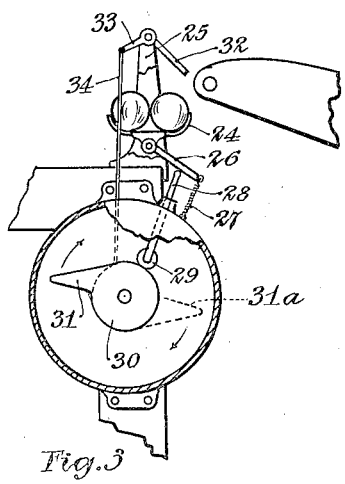
Figure 3 is a view in side elevation of a receiving hopper and operative mechanism therefor, a portion of a cam housing being broken away to disclose the interior mechanism.
Figure 6:
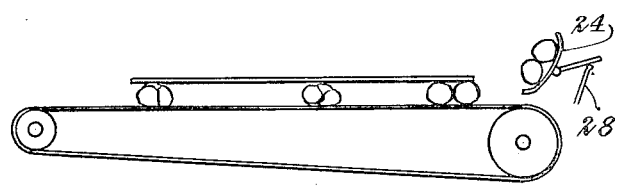
Figure 6 is a schematic view in side elevation of the actuating belts, pressure board, and hopper of a device embodying the present invention, masses of dough in various stages of processing being illustrated therein.

The cam starts in the dotted line position 31a shown in Figure 3. Upon the discharge of the first cylindrical mass of dough into the pan 24 the plate 32 will be depressed, raising the lever 33 and with it the link 34, thereby releasing the trip pawl which controls the movement of the cam 30, permitting the cam to rotate one-half a revolution to the solid line position shown in Figure 3. During this motion the roller 29 will travel upon the circular portion of the cam and will not actuate the push rod 28. Upon the discharge of the second cylindrical mass of dough into the pan 24 the plate 32 will again be depressed, raising the lever 33 and the link 34 and will again release the cam 30 for one-half revolution. During this second half of the revolution, the portion 31 of the cam will pass beneath the roller 29, raising the push rod to the position indicated in Figure 6, and discharging the pair of cylindrical dough masses onto the traveling belts. The single cylindrical masses of dough are shown at 60 and 61, Figure 4, and the two twisted together as they are discharged from the present mechanism at 62. As the portion 31 of the cam passes the roller 29, the roller will again drop to the cylindrical portion of the cam and the spring 27 will restore the pan 24 to its normal position, ready to receive another pair of dough masses.

A pair of side plates 35 and 36, which limit the elongation of the mass of dough during the twisting operation, are mounted on threaded shafts 37 and 38 which are provided with handles 39 by means of which the side boards 35 and 36 may be moved inwardly or outwardly to control the length of the mass of dough formed. The top pressure board 40 is provided with four bushings 41 on the upper surface thereof in which are rotatably mounted threaded shafts 42. These threaded shafts are each screwed onto the threaded interior of worm gears 43. A longitudinal shaft 44 is rotatably mounted in supports 45 which also support the vertical threaded shafts 42 and the worm gears 43, each longitudinal shaft 44 being arranged to operate two of the threaded vertical shafts 42. Each longitudinal shaft 44 has a pair of worm gears 46 and 47 which engage the worm gears 43 to rotate them. An operating wheel 48 is provided on the outer end of each of the longitudinal shafts 44. Thus, by rotating the shafts 44 by means of the operating wheels 48, the worm gears 46 and 47 will rotate the worm gears 43 and screw the threaded vertical shafts 42 up or down, as desired, to regulate the height of the pressure board 40. The action of the mechanism on a pair of dough masses is clearly illustrated in Figure 6. Upon raising of the push rod 28 by means of the cam 30, as illustrated in Figure 3, the pan 24 will be tilted to discharge a pair of dough masses onto the traveling belts 20 and 21. As the masses of dough come beneath the pressure board 40, the right hand belt 21, traveling more rapidly than the left hand portion, will tend to carry the right hand end of the dough masses forward. The pressure board being continuous throughout its width will resist this tendency and will cause the upper portion of the dough mass to drag on the pressure board. This action will cause a rotation of a pair of dough masses opposite to its direction of travel. The same effect will occur, of course, but more slowly, on the more slowly traveling left hand portion of the mass of dough and thus the two cylindrical masses of dough will be twisted together in the form shown in the right hand portion of Figure 4.

Figure 7:
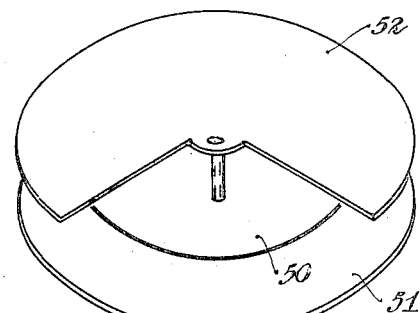
Figure 7 is a schematic view in perspective of a modified form of conveyor mechanism, and pressure board and showing these parts in discoid form.
Figure 8:
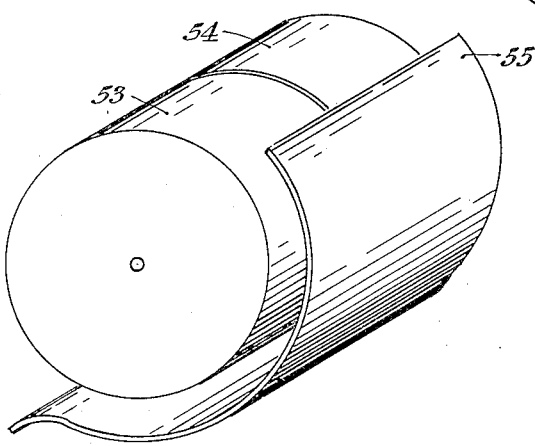
Figure 8 is a schematic view in perspective of a still further modification, showing the operative parts in cylindrical form.

The modified forms of the device shown in Figures 7 and 8 do not pretend to show a complete operative mechanism, simply showing different forms of differential traveling surfaces and pressure boards adapted to co-operate therewith. In Figure 7 a pair of concentric disks 50 and 51 are positioned beneath a segmental pressure board 52 and in Figure 8 a pair of cylindrical rolls 53 and 54 are positioned interiorly of a cylindrical pressure board 55. It would be a simple matter for a skilled mechanic familiar with this particular branch of the art to construct a satisfactory working mechanism from either of these suggested modifications and to illustrate and describe them in detail would unnecessarily complicate the present specification.

The device provides a simple and effective mechanism for twisting together dough masses of predetermined length and thickness, suitable for inserting directly into baking pans, and when baked provides a loaf of smooth and uniform texture with no possibility for shell crusting of the baked loaves.

I claim:

1. A dough processing mechanism, comprising a pair of relatively movable conveyor members, power drive means adapted to move said members at a differential rate of speed with respect to each other, a pressure board mounted above said members and spaced therefrom a distance equal approximately to the diameter required for a processed plastic mass to be treated therein, a pair of side members positioned between said members and said pressure board to limit the elongation of a plastic mass therein, and a hopper adapted to discharge pairs of plastic dough masses onto said conveyors.

2. A dough processing mechanism, comprising a pair of relatively movable conveyor members, power drive means adapted to move said conveyor members at a differential rate of speed with respect to each other, a pressure board mounted in spaced relation from said conveyor members, a pair of side members mounted to limit the elongation of a plastic mass positioned between said conveyor member and said pressure member, and means adapted to discharge pairs of plastic dough masses between said conveyor members and said pressure board.

3. A machine for simultaneously rolling and longitudinally twisting a pair of dough masses, comprising a pair of movable conveyor members mounted in substantially the same plane, power drive means adapted to move said conveyor members at a differential rate of speed with respect to each other, a pressure member mounted in perpendicularly spaced relation thereto, and means for introducing pairs of elongated, laterally adjacent dough masses between said pressure member and said relatively movable members.

4. The method of treating dough for baking which comprises forming dough into a pair of elongated masses, of positioning said dough masses in lateral proximity to each other, and of rolling said pair of dough masses, one end of said pair of dough masses being moved at a differential rate of speed with respect to the other end thereof to simultaneously roll and to twist said dough masses together around a longitudinal axis thereof.

5. The method of treating dough, which comprises forming dough into a pair of elongated masses, of placing said dough masses in lateral proximity to each other, and of rolling the opposite ends of said dough at differential speeds with respect to each other to produce a combined rolling and longitudinal twisting action on said dough masses.

6. The method of treating dough, which comprises forming dough into a pair of laterally adjacent, elongated masses, and of subjecting the pair of dough masses thus positioned to a combined rolling and pressing action, one end of said pair of dough masses being rolled at a differential rate of speed with respect to the other end thereof to produce a twisting movement about a longitudinal axis of said pair of dough masses.

7. The method of shaping dough, including progressing elongated pieces of dough in contact with each other in a direction transverse to their lengths while simultaneously twisting them about each other.

8. The method of shaping dough, including progressing a portion of dough, consisting of elongated pieces arranged side by side, in a direction transverse to its length while simultaneously imparting rotary movements to at least one end of the portion.

GEORGE H. EKSTEDT.